Figure 1:
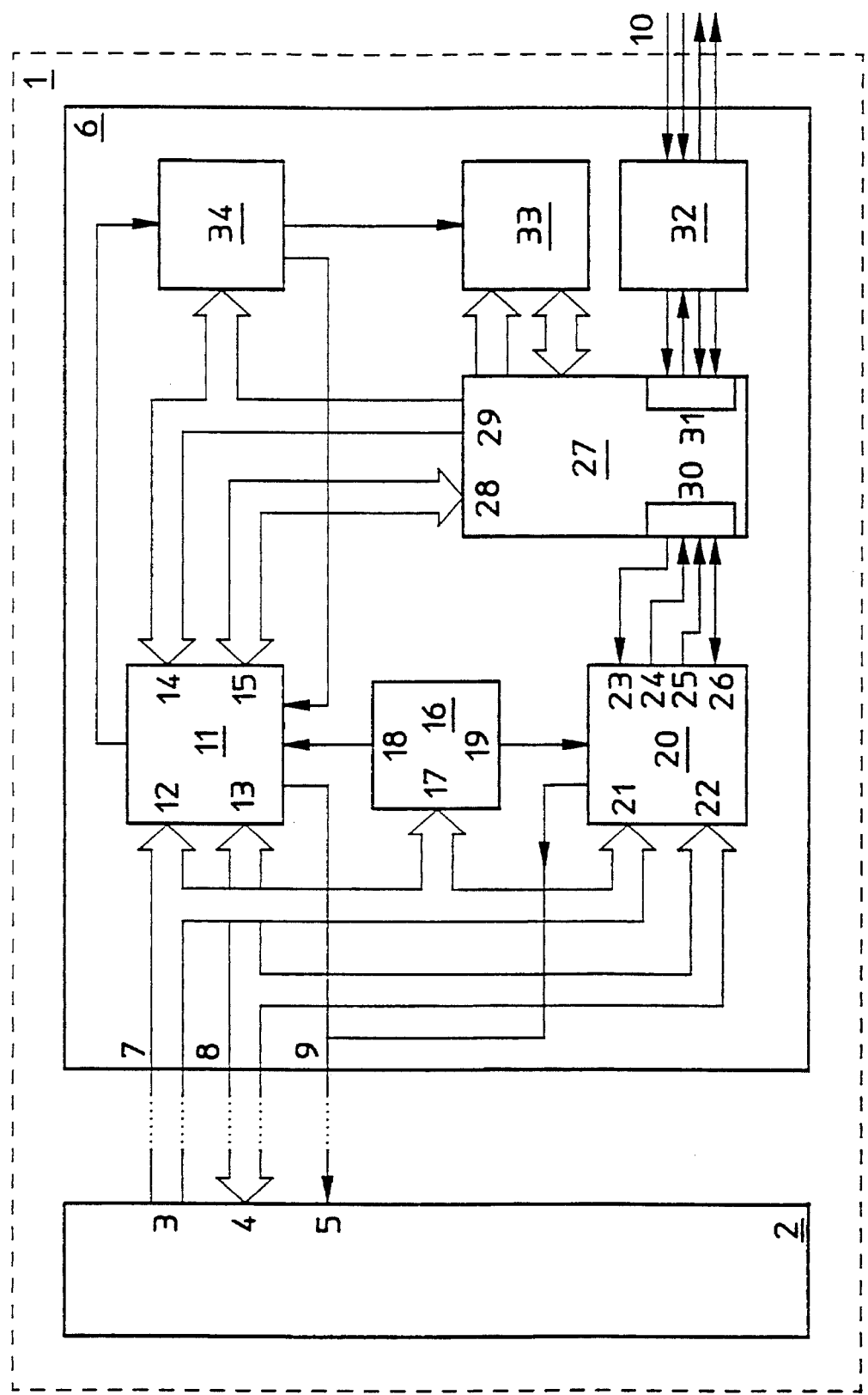

United States Patent [19]
Vankan et al.

[11] Patent Number: 5,560,031
[45] Date of Patent: Sep. 24, 1996

[54] PROCESSOR CIRCUIT COMPRISING A FIRST PROCESSOR, AND SYSTEM COMPRISING THE PROCESSOR CIRCUIT AND A SECOND PROCESSOR

[75] Inventors: Franciscus A. G. Vankan, Tilburg; Rob Pieterse, Zandvoort, both of Netherlands

[73] Assignee: Koninklijke PTT Nederland N.V., Netherlands

[21] Appl. No.: 263,538

[22] Filed: Jun. 22, 1994

[30] Foreign Application Priority Data

Jun. 29, 1993 [NL] Netherlands ............ 9301129

[51] Int. Cl.$^6$ .................................. G06F 15/00
[52] U.S. Cl. ............... 395/800; 395/476; 364/238.3; 364/244.8; 364/284.4; 364/DIG. 1
[58] Field of Search .................... 395/800, 476; 364/238.3, 244.8, 284.4, DIG. 1

[56] References Cited

U.S. PATENT DOCUMENTS

5,448,714 9/1995 Stodieck .................... 395/476

FOREIGN PATENT DOCUMENTS

| | | |
|---|---|---|
| 0410314 | 1/1991 | European Pat. Off. . |
| 0525985 | 2/1993 | European Pat. Off. . |
| 9222034 | 12/1992 | WIPO . |

OTHER PUBLICATIONS

S. Naqvi, "Low-cost, dual-port RAM design delivers high performance", *Electrical Design News*, Jan. 1985, vol. 30, No. 2, pp. 155-158, 160.

*Primary Examiner*—Alyssa H. Bowler
*Assistant Examiner*—John Harrity
*Attorney, Agent, or Firm*—Peter L. Michaelson; Michael P. Straub; Michaelson & Wallace

[57] ABSTRACT

Processor circuit having two communication paths suitable for modem applications is described. The card includes a receiving/transmitting (R/T) circuit and a first processor. The R/T circuit is coupled to a second processor, e.g., the processor of a personal computer. It is also coupled to a network via the first processor. Data to and from the network is routed by the first processor to the second processor via the R/T circuit. A dual access memory device is also used to couple the first and second processors together. Use of the dual access memory device simplifies error diagnosis and the passing of error information between the first and second processors. A new main program is placed in a RAM of the first processor without the need for an expensive emulator or use of an EEPROM through the use of the dual access memory device. By storing an auxiliary program, e.g., a bootstrap program, in a first section of the dual access memory device, beginning at a start address of the first processor, and by receiving a main program which originates from the second processor, via a second section of the dual access memory device, the main program can be stored in a memory linked to the first processor at a second address within the memory space of the first processor. By renumbering the second address so that the main program is located at the start address of the address space of the first processor, the first processor is loaded with the main program.

10 Claims, 2 Drawing Sheets

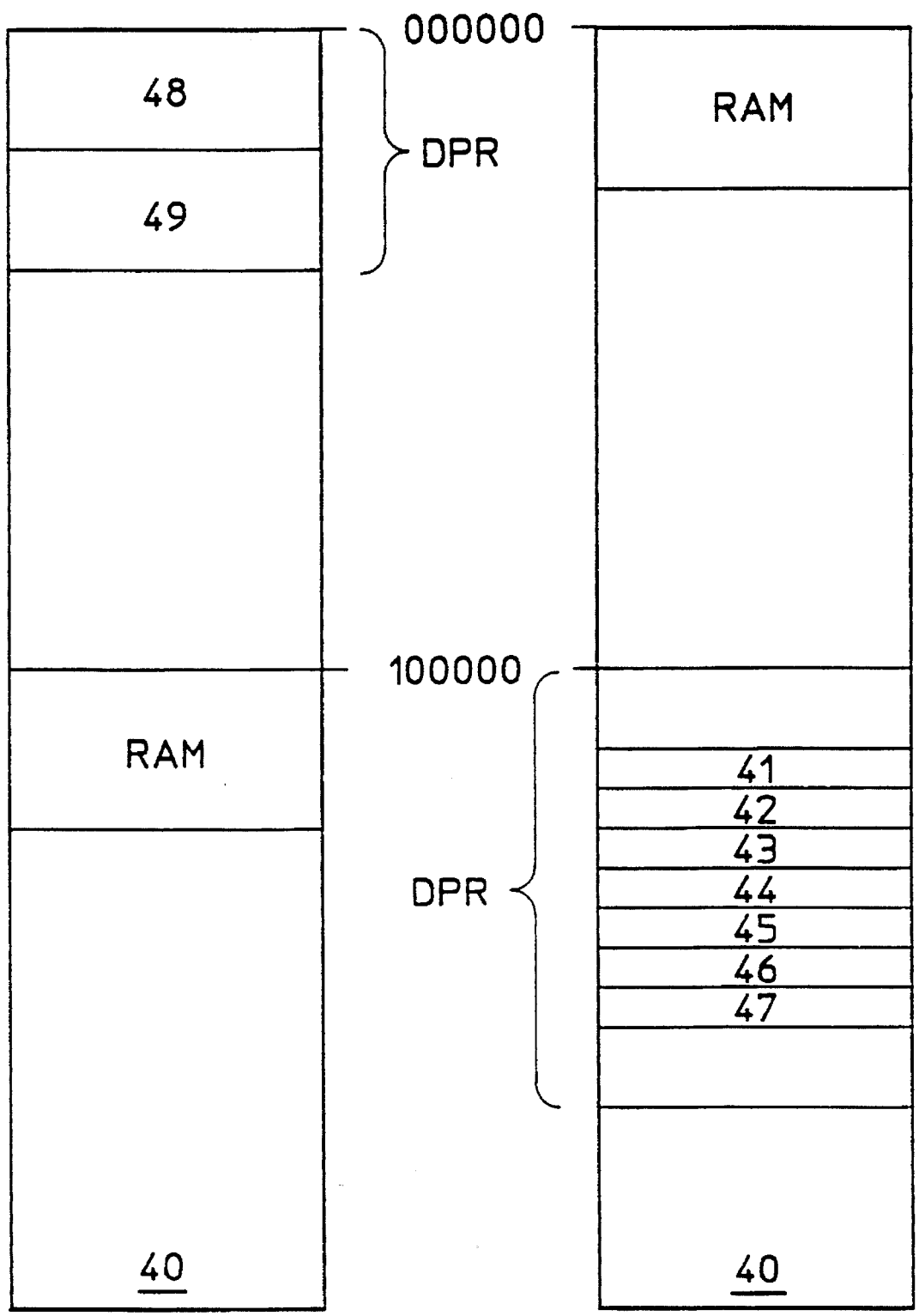

PROCESSOR CIRCUIT COMPRISING A FIRST PROCESSOR, AND SYSTEM COMPRISING THE PROCESSOR CIRCUIT AND A SECOND PROCESSOR

BACKGROUND OF THE INVENTION

The invention relates to a processor circuit comprising a first processor and provided with a parallel address input and a parallel data in/output, both for linkage to a second processor, and with a serial in/output for linkage to a digital network, which first processor is provided with

- a first serial processor in/output which, via a converter circuit, is linked to the serial in/output of the processor circuit, and
- a second serial processor in/output which, via a receiving/transmitting circuit for converting parallel information into serial information and vice versa, is linked to the parallel address input and to the parallel data in/output.

A processor circuit of this type is generally known. It can be, for example, a personal computer card or PC card via which a PC processor (the second processor) is linked to an ISDN network (the digital network). On the PC card (the processor circuit) there is situated, for example, a 68302 processor (the first processor), a first serial processor in/output of which is linked via ISDN chips (the converter circuit) to a serial in/output of the PC card for connection to the ISDN network, and a second serial processor in/output of which is linked, via a UART (Universal Asynchronous Receiver Transmitter, the receiving/transmitting circuit for converting parallel information into serial information and vice versa), to a parallel address in/output and to a parallel data in/output of the PC card. These two in/ outputs can be linked to the PC processor. Such a PC card is eminently suitable for modem applications, as it is very simple for the 68302 processor to interpret the commands, such as, for example, Hayes commands, which are to be received from the PC processor via the UART.

This known processor circuit has the drawback that it is relatively difficult in a processor circuit of this type to perform error diagnoses, which should take place frequently, particularly during test phases.

SUMMARY OF THE INVENTION

One of the objects of the invention is to provide a processor circuit of the type mentioned in the preamble, with error diagnosis being simpler.

To this end, the processor circuit according to the invention is characterized in that the processor circuit comprises dual memory means which are provided with

- a first parallel address input which is linked to a parallel address output of the first processor,
- a first parallel data in/output which is linked to a parallel data in/output of the first processor,
- a second parallel address input which is linked to the parallel address input of the processor circuit,
- a second parallel data in/output which is linked to the parallel data in/output of the processor circuit.

Via the receiving/transmitting circuit, connections between the ISDN network and the second processor can be set up and/or broken, and data can be sent back and forth. Use of the dual memory means creates an alternative option (which provides for certain checks to be carried out) for enabling the setting up and/or cutting-off of said connections to proceed via the dual memory means. Even the transmission of data back and forth could proceed via the dual memory means, but if modem applications are used, the interpretation, by the first processor, of the commands originating from the second processor is less simple. Performing error diagnoses becomes simpler, because an error present in the first processor and belonging to a certain category is stored in the dual memory means at a location (address field) which is a function of the category to which the error belongs. The second processor, which is fully aware of the various locations and the error categories corresponding thereto in the dual memory means, is thus informed of the error belonging to a certain category without a large amount of overhead information having to be appended to this error. This is in contrast to the case where this error is transmitted via the transmitting/receiving circuit, when a large amount of overhead information would indeed have to be appended to the error, which information would have to be re-interpreted by the second processor for every error. Moreover, dual memory means are able to transmit, for example, 1.5 kilobytes of information to the second processor on the basis of one interrupt, while a transmitting/receiving circuit can only transmit at most 16 bytes of information to the second processor on the basis of one interrupt.

The invention is based, inter alia, on the insight that a processor circuit having only one receiving/transmitting circuit is eminently suitable for modem applications and less suitable for diagnosing errors, owing to the large amount of overhead information required in that case, while it is possible, by using dual memory means, to reduce considerably such a large amount of overhead information, by assigning different significations to different locations in these dual memory means.

A first embodiment of the processor circuit according to the invention is characterized in that the processor circuit comprises an address-decoding circuit, a parallel address input of which is linked to the parallel address input of the processor circuit and a first control output of which is linked to the receiving/transmitting circuit and a second control output of which is linked to the dual memory means.

Now it is possible, by using the address-decoding circuit, to determine, by means of a single address or address field originating from the second processor, whether data information originating from the second processor is destined for the transmitting/receiving circuit or for the dual memory means.

A second embodiment of the processor circuit according to the invention is characterized in that the processor circuit is adapted for

- receiving an auxiliary program from the second processor,
- storing the auxiliary program in a first section of the dual memory means, which first section is situated, beginning at a start address, in address space belonging to the first processor,
- receiving a main program via a second section of the dual memory means,
- storing the main program in a memory linked to the first processor, which memory is situated, beginning at a further address, in address space belonging to the first processor, and then
- replacing the further address by the start address.

By storing an auxiliary program such as, for example, a bootstrap program in a first section of the dual memory means, beginning at the start address 000000 (hexadecimal) situated in the address space of the first processor, and by receiving the main program which originates from the second processor, such as, for example, a communication program, via a second section of the dual memory means, said main program can be stored in a memory linked to the first processor, such as, for example, a RAM, beginning at the further address 100000 (hexadecimal) situated in the address space of the first processor. If the further address is then replaced by the start address, the memory which is linked to the first processor and has been loaded with the main program, is located beginning at the start address, and any communication via the main program may commence, the auxiliary program, which is no longer required, being free to be overwritten. Thus a new main program is placed in the RAM of the first processor without an expensive emulator being required in the process or without a very labour-intensive EPROM being required for each new main program. This embodiment saves costs in the form of depreciation and investment and in the form of man hours, particularly during test phases.

A third embodiment of the processor circuit according to the invention is characterized in that the processor circuit comprises a further address-decoding circuit which is provided with a control input for receiving a start signal, a parallel address input of which further address-decoding circuit is linked to the parallel address output of the first processor and a first control output of which is linked to the memory and a second control output of which is linked to the dual memory means.

By means of this further address-decoding circuit, the abovementioned replacement of the further address by the start address is implemented. Via a control input, a start signal (a so-called download signal) originating, for example, from the dual memory means is received, while a first control output drives a chip-select input of the memory and a second control output drives a chip-select input of the dual memory means.

It should be noted that processor circuits provided with dual memory means are known per se. These are not, however, processor circuits for linkage to a digital network which are suitable for modem applications by using receiving/transmitting circuits present in these processor circuits.

It should also be noted that the second embodiment of the processor circuit according to the invention can in principle also be used in processor circuits in which only dual memory means are present and in which, therefore, no receiving/transmitting circuits are present.

The invention further relates to a system comprising a processor circuit having a first processor and comprising a second processor, which processor circuit is provided with a parallel address input and a parallel data in/output which are both linked to the second processor, and with a serial in/output for linkage to a digital network which first processor is provided with a first serial processor in/output which, via a converter circuit, is linked to the serial in/output of the processor circuit, and a second serial processor in/output which, via a receiving/transmitting circuit for converting parallel information into serial information and vice versa, is linked to the parallel address input and to the parallel data in/output.

It is a further object of the invention, inter alia, to provide a system of the abovementioned type, where error diagnoses are simpler to perform.

To this end, the system according to the invention is characterized in that the processor circuit comprises dual memory means which are provided with a first parallel address input which is linked to a parallel address output of the first processor, a first parallel data in/output which is linked to a parallel data in/output of the first processor, a second parallel address input which is linked to the parallel address input of the processor circuit, a second parallel data in/output which is linked to the parallel data in/output of the processor circuit.

A first embodiment of the system according to the invention is characterized in that the processor circuit comprises an address-decoding circuit, a parallel address input of which is linked to the parallel address input of the processor circuit and a first control output of which is linked to the receiving/transmitting circuit and a second control output of which is linked to the dual memory means.

A second embodiment of the system according to the invention is characterized in that the processor circuit is adapted for receiving an auxiliary program from the second processor, storing the auxiliary program in a first section of the dual memory means, which first section is situated, beginning at a start address, in address space belonging to the first processor, receiving a main program via a second section of the dual memory means, storing the main program in a memory linked to the first processor, which memory is situated, beginning at a further address, in address space belonging to the first processor, and then replacing the further address by the start address.

A third embodiment of the system according to the invention is characterized in that the processor circuit comprises a further address-decoding circuit which is provided with a control input for receiving a start signal, a parallel address input of which further address-decoding circuit is linked to the parallel address output of the first processor and a first control output of which is linked to the memory and a second control output of which is linked to the dual memory means.

REFERENCE

"PConnect—interface between PC and ISDN", J. Höflinger, W. H. Leinweber, Philips Telecommunication Review volume 50, No. 1, Dutch patent application No. 9301129 (priority document).

These references are considered to be incorporated in the present application.

SPECIFIC EMBODIMENT

The invention will be; explained in more detail by reference to a specific embodiment shown in the figures, in which:

FIG. 1 shows a system according to the invention comprising a processor circuit according to the invention, and FIGS. 2A and 2B shows a partitioning of the address space belonging to the first processor, for use in a processor circuit according to the invention.

The system 1 shown in FIG. 1 comprises a second processor or PC processor 2 which is provided with an address output 3, a data in/output 4 and an interrupt input 5. The system 1 further comprises a processor circuit or PC card 6, a serial in/output 10 of which (a so-called S bus interface which comprises two go and two return balanced lines in accordance with CCITT '88 I.430) is linked to a digital network such as an ISDN network. Processor circuit 6 is further equipped with a parallel address input 7, a parallel data in/output 8 and an interrupt output 9. Processor circuit 6 comprises dual memory means or DPR circuit 11 (comprising a DPR or Dual Ported RAM, for example an IDT 71321 and logic linked thereto), address-decoding circuit 16, receiving/transmitting circuit or UART (Universal Asynchronous Receiver Transmitter, for example NS 16C450N) 20, first processor or 68302 processor 27, converter circuit 32 (for example ISAC-S: PEB 2085 P, ARCOFI: PSB 2160 P, ICC: PEB 2070 P, all available from Siemens), memory or RAM 33 and further address-decoding circuit 34 (logic is in general implemented by means of XILINX: XC3042). Of DPR circuit 11, a first parallel address input 14 is linked to a parallel address output 29 of 68302 processor 27, and a first parallel data in/output 15 is linked to a parallel data in/output 28 of 68302 processor 27. A second parallel address input 12 of DPR circuit 11 is linked to the parallel address input 7, a second parallel data in/output 13 of DPR circuit 11 is linked to parallel data in/output 8, and an interrupt output of DPR circuit 11 is linked to the interrupt output 9. Of UART 20, a parallel address input 21 is linked to the parallel address input 7, a parallel data in/output 22 is linked to the parallel data in/output 8, and an interrupt output is linked to the interrupt output 9. Of address-decoding circuit 16, a parallel address input 17 is linked to the parallel address input 7, a first control output 19 is linked to a chip-select input of UART 20, and a second control output 18 is linked to a first chip-select input of DPR circuit 11. The 68302 processor 27 is equipped with a first serial processor in/output 31 which, via the converter circuit 32, is linked to the serial in/output 10. In this case, there are four connections, i.e. one connection from 68302 processor 27 to converter circuit 32 (Transmit) and three connections from converter circuit 32 to 68302 processor 27 (Receive, data clock and frame clock). Furthermore, 68302 processor 27 is equipped with a second serial in/output 30 which is linked to UART 20. In this case, there are one connection from 68302 processor 27 to an input 23 of UART 20 (Receive), two connections from outputs 24 and 25 of UART 20 to 68302 processor 27 (Transmit and clock), and a number of further connections four of which, for example, go from 68302 processor 27 to an in/output 26 of UART 20 and, for example, two from 68302 processor 27 to the in/output 26 of UART 20 (Check). RAM 33 is linked, in a manner known to those skilled in the art, to 68302 processor 27, (via a unidirectional address bus and a bidirectional databus). A further decoding circuit 34 is equipped with an address input which is linked to the address output of the 68302 processor 27, and with a control input which is linked to DPR circuit 11 for receiving a start signal (a download signal). A first control output of further decoding circuit 34 is linked to a chip-select input of RAM 33, and a second control output of further decoding circuit 34 is linked to a second chip-select input of DPR circuit 11.

The partitioning, shown in FIGS. 2A and 2B, of address space 40 belonging to the 68302 processor 27 comprises, according to FIG. 2a, address space 48, 49 beginning at address 000000 (start address, hexadecimal) for the benefit of a first and a second section, respectively, of DPR circuit 11, and, beginning at address 100000 (further address, hexadecimal), address space for the benefit of RAM 33, and comprises, according to FIG. 2b, address space beginning at address 000000 for the benefit of RAM 33 and, beginning at address 100000, address space for the benefit of DPR circuit 11, of which a section is partitioned into fields 41 to 47 inclusive.

The mode of operation of the specific embodiment depicted in the figures, if RAM 33 has already been loaded with a main program (a communication program) (FIG. 2b) is as follows. If a connection to the ISDN network needs to be set up, PC processor 2 transmits address and data information via address in/output 3 and data in/output 4. The address information reaches address-decoding circuit 16 which, in response thereto and via the control inputs 18 and 19, respectively, does not select DPR circuit 11 and does select UART 20. UART 20 converts the parallel data information into serial information which is fed to serial in/output 30. The 68302 processor 27 processes this information on the basis of the communication program stored in RAM 33, the processed information then being transmitted via serial in/output 31 to converter circuit 32 which converts this processed information into ISDN signals. A connection between the PC processor 2 and the ISDN network is thus set up, and in the same way data is transmitted (i.e. via UART 20) from PC processor 2 to the ISDN network and vice versa, and the connection is broken again. In this case, communication is obviously also possible between an ISDN telephone and the ISDN network, the ISDN telephone being connected to the processor circuit 6 via a connector not shown in the figures. Such a connector is connected to converter circuit 32 in a manner known to those skilled in the art.

If 68302 processor 27 detects an error, said error could be transmitted, supplemented with a considerable amount of overhead information, to PC processor 2 via UART 20. This disadvantageous requirement of having to supplement errors with overhead information can be avoided, however, by using DPR circuit 11 when errors have been detected. If RAM 33 has already been loaded with the communication program, address space 40 comprises the fields 41 to 47 inclusive, beginning at address 100000. The field 41 is intended, for example, for errors on the route PC→B1, field 42 for errors on the route PC→B2, field 43 for errors on the route PC→D, field 44 for errors on the route B1→PC, field 45 for errors on the route B2→PC, field 46 for errors on the route D→PC and field 47 is intended, for example, as a signalling field for the fields 41 to 46 inclusive. In this context, PC refers to the PC processor 2, while B1, B2 and D, respectively, refer to the two data channels and the signalling channel of the ISDN network. Thus, 68302 processor 27 transmits the detected error via one of the fields 41 to 47 inclusive to PC processor 2, depending on the category to which the error belongs, without much overhead information having to be appended. PC processor 2 should obviously be well aware of the abovementioned partitioning.

As DPR circuit 11 is able to transmit, for example, 1.5 kilobytes of information to PC processor 2 on the basis of one interrupt, while UART 20 is able to transmit at most 16 bytes of information to PC processor 2 on the basis of one interrupt, DPR circuit 11 is moreover able to send many more error reports simultaneously than is possible by means of UART 20.

Setting up and breaking connections to the ISDN network and transmitting data could, in principle, likewise be effected via DPR circuit 11, without UART 20 being required for this purpose. The interpretation of commands associated with modem applications, such as HAYES commands, by 68302 processor 27 in that case, however, requires complex software which is avoided by using UART 20.

If RAM 33 is to be loaded with a subsequent (improved) communication program (FIG. 2a), further address-decoding circuit 34 receives a start signal (download signal) from DPR circuit 11, as a result of which address space 40, which belongs to 68302 processor 27, according to FIG. 2a comprises address space 48, 49 beginning at address 000000 (start address) for the benefit of a first and a second section, respectively, of DPR circuit 11 and, beginning at address 100000 (further address), address space for the benefit of RAM 33. An auxiliary program originating from PC processor 2, such as a bootstrap program, is placed in the first section of DPR circuit 11 (corresponding to field 48), whereupon the new communication program is placed in RAM 33 via the second section of DPR circuit 11 (corresponding to field 49). Then, if the new communication program has been loaded, further decoding circuit 34 is driven via DPR circuit 11 by PC processor 2 in such a way that the further address situated in the address space of 68302 processor 27 is replaced by the start address. In other words, the further address 100000 is given the value 000000, as a result of which there is address space for RAM 33 in the address space of 68302 processor 27, beginning at address 000000, and there is address space for DPR circuit 11 beginning at address 100000 (FIGS. 2A and 2B). As a result of RAM 33 having been loaded with the new communication program and, in this case, being located, beginning at the start address, in the address space belonging to the 68302 processor 27, the PC card 2 is suitable for communication, the bootstrap program, situated in DPR circuit 11, which is now located, beginning at address 100000, in the address space of 68302 processor 27, becoming overwritable. Thus it becomes possible, by using DPR circuit 11, to load another main program into RAM 33 without an expensive emulator being required (which, for the purpose of loading, temporarily needs to take the place of the 68302 processor), or without a labour-intensive EPROM being required. By this manner of loading, costs in the form of investment and depreciation and in the form of man hours are saved, particularly during test phases when loading of new main programs is required regularly. Furthermore, this manner of loading is independent, does not affect the use in processor circuit 6, of both DPR circuit 11 and UART 20, and this manner of loading can in principle be used with any processor circuit which is provided with a DPR circuit and a processor having a RAM.

What is claimed is:

1. A processor circuit for coupling a digital network to a second processor, comprising:

a parallel address input for coupling to the second processor;

a parallel data in/output for coupling to the second processor;

a serial in/output for coupling to the digital network;

a first processor having a first and a second serial processor in/output, the first serial processor in/output being coupled via a converter circuit to the serial in/output of the processor circuit;

a receiving/transmitting circuit, for converting between parallel and serial information, coupled to the second serial processor in/output, the parallel address input, and the parallel data in/output;

dual memory means including:

i. a first parallel address input coupled to a parallel address output of the first processor;

ii. a first parallel data in/output coupled to a parallel data in/output of the first processor;

iii. a second parallel address input coupled to the parallel address in/output of the processor circuit; and iv. a second parallel data in/output coupled to the parallel data in/output of the processor circuit; and wherein the processor circuit is adapted for receiving an auxiliary program from the second processor;

storing the auxiliary program in a first section of the dual memory means, which first section is situated, beginning at a start address, in an address space belonging to the first processor;

receiving a main program via a second section of the dual memory means;

storing the main program in a memory coupled to the first processor, which memory is situated, beginning at a further address, in the address space belonging to the first processor, and then renumbering the further address so that the main program is located at the start address of the address space belonging to the first processor.

2. The processor circuit according to claim 1, further comprising:

an address-decoding circuit having a control input for receiving a start signal, a parallel address input coupled to the parallel address output of the first processor, a first control output coupled to the memory, and a second control output coupled to the dual memory means.

3. A processor circuit for coupling a digital network to a second processor, comprising:

a parallel address input for coupling to the second processor;

a parallel data in/output for coupling to the second processor;

a serial in/output for coupling to the digital network;

a first processor having a first and a second serial processor in/output, the first serial processor in/output being coupled via a converter circuit to the serial in/output of processor circuit;

a receiving/transmitting circuit, for converting between parallel and serial information, coupled to the second serial processor in/output, the parallel address input, and the parallel data in/output;

dual memory means including:

i. a first parallel address input coupled to a parallel address output of the first processor;

ii. a first parallel data in/output coupled to a parallel data in/output of the first processor;

iii. a second parallel address input coupled to the parallel address input of the processor circuit; and iv. a second parallel data in/output coupled to the parallel data in/output of the processor circuit;

a first address decoding circuit having a parallel address input coupled to the parallel address input of the processor circuit, a first control output coupled to the receiving/transmitting circuit and a second control output coupled to the dual memory means; and wherein the processor circuit is adapted for receiving an auxiliary program from the second processor;

storing the auxiliary program in a first section of the dual memory means, which first section is situated, beginning at a start address, in an address space belonging to the first processor;

receiving a main program via a second section of the dual memory means;

storing the main program in a memory coupled to the first processor, which memory is situated, beginning at a further address, in the address space belonging to the first processor, and then renumbering the further address so that the main program is located at the start address of the address space belonging to the first processor.

4. The processing circuit of claim 3, further comprising:

a second address-decoding circuit having a control input for receiving a start signal, a parallel address input coupled to the parallel address output of the first processor, a first control output coupled to the memory, and a second control output coupled to the dual memory means.

5. A processor circuit for coupling a digital network to a second processor, comprising:

a parallel address input for coupling to the second processor;

a parallel data in/output for coupling to the second processor;

a serial in/output for coupling to the digital network;

a first processor having a first serial processor in/output coupled to the serial in/output of the processor circuit;

dual memory means including:

i. a first parallel address input coupled to a parallel address output of the first processor;

ii. a first parallel data in/output coupled to a parallel data in/output of the first processor;

iii. a second parallel address input coupled to the parallel address input of the processor circuit; and iv. a second parallel data in/output coupled to the parallel data in/output of the processor circuit;

a memory coupled to the first processor; and wherein the processor circuit is adapted for receiving an auxiliary program from the second processor;

storing the auxiliary program in a first section of the dual memory means, which first section is situated, beginning at a start address, in an address space belonging to the first processor;

receiving a main program via a second section of the dual memory means;

storing the main program in the memory coupled to the first processor, which memory is situated, beginning at a further address, in the address space belonging to the first processor, and then renumbering the further address so that the main program is located at the start address of the address space belonging to the first processor.

6. The processor circuit of claim 5, further comprising:

an address-decoding circuit having a control input for receiving a start signal, a parallel address input coupled to the parallel address output of the first processor, a first control output coupled to the memory, and a second control output coupled to the dual memory means.

7. A processor circuit for coupling a digital network to a second processor, comprising:

a parallel address input for coupling to the second processor;

a parallel data in/output for coupling to the second processor;

a serial in/output for coupling to the digital network;

a first processor having a first and a second serial processor in/output, the first serial processor in/output being coupled via a converter circuit to the serial in/output of the processor circuit;

a receiving/transmitting circuit, for converting between parallel and serial information, coupled to the second serial processor in/output, the parallel address input, and the parallel data in/output;

dual memory means including:

i. a first parallel address input coupled to a parallel address output of the first processor;

ii. a first parallel data in/output coupled to a parallel data in/output of the first processor;

iii. a second parallel address input coupled to the parallel address input of the processor circuit; and iv. a second parallel data in/output coupled to the parallel data in/output of the processor circuit; and control means for controlling communication of information between the second processor, the receiving/transmitting circuit and the dual memory means.

8. The processor circuit of claim 7, wherein the control means includes:

a first address decoding circuit having a parallel address input coupled to the parallel address input of the processor circuit, a first control output coupled to the receiving/transmitting circuit, and a second control output coupled to the dual memory means.

9. The processor circuit of claim 8, further comprising:

a second address-decoding circuit having a control input for receiving a start signal, a parallel address input coupled to the parallel address output of the first processor, and a control output coupled to the dual memory means.

10. The processor circuit of claim 7, further comprising:

a second address-decoding circuit having a control input for receiving a start signal, a parallel address input coupled to the parallel address output of the first processor, and a control output coupled to the dual memory means.

* * * * *